(12) United States Patent
Shabah et al.

(10) Patent No.: US 11,442,138 B2
(45) Date of Patent: Sep. 13, 2022

(54) METHOD AND SYSTEM FOR DETERMINING A POSITION OF A PLURALITY OF TRANSMITTING NODES

(71) Applicant: Humanitas Solutions Inc., Montréal (CA)

(72) Inventors: Abdo Shabah, Montréal (CA); Luca G. Gianoli, Montréal (CA); Alexandra Aguiar, Montréal (CA)

(*) Notice: Subject to any disclaimer, the term of this patent is extended or adjusted under 35 U.S.C. 154(b) by 0 days.

(21) Appl. No.: 17/254,749

(22) PCT Filed: Jun. 20, 2019

(86) PCT No.: PCT/IB2019/055225
§ 371 (c)(1),
(2) Date: Dec. 21, 2020

(87) PCT Pub. No.: WO2019/244104
PCT Pub. Date: Dec. 26, 2019

(65) Prior Publication Data
US 2021/0270929 A1    Sep. 2, 2021

Related U.S. Application Data

(60) Provisional application No. 62/688,736, filed on Jun. 22, 2018.

(51) Int. Cl.
*H04W 24/00*     (2009.01)
*G01S 5/02*      (2010.01)
(Continued)

(52) U.S. Cl.
CPC .............. *G01S 5/0289* (2013.01); *G01S 11/06* (2013.01); *H04B 17/27* (2015.01); *H04B 17/318* (2015.01); *H04W 28/0268* (2013.01); *G01S 5/14* (2013.01)

(58) Field of Classification Search
CPC .. H04W 28/0268; H04W 64/00; H04W 84/18
(Continued)

(56) References Cited

U.S. PATENT DOCUMENTS

| 8,045,482 B2 | 10/2011 | Davis et al. |
| 9,231,858 B1* | 1/2016 | Greifeneder ........ G06F 11/3632 |

(Continued)

FOREIGN PATENT DOCUMENTS

| CN | 104828698 A | 8/2015 |
| CN | 106970353 B | 7/2017 |

OTHER PUBLICATIONS

Blumenthal, J. et al., "Minimal transmission power vs. signal strength as distance estimation for localization in wireless sensor networks", 2006, 3rd Annual IEEE Communications Society on Sensor and Ad Hoc Communications and Networks, pp. 1-6.
(Continued)

*Primary Examiner* — Joseph Arevalo
(74) *Attorney, Agent, or Firm* — Wiggin and Dana LLP; Brian A. Pattengale

(57) ABSTRACT

A method is disclosed for estimating a position of a plurality of transmitting nodes. The method comprises installing a telecommunication application in each of the plurality of transmitting nodes; transmitting a plurality of data packets; generating a plurality of transmission quality coefficients using the plurality of data packets; determining a corresponding plurality of transmission scores; estimating a distance between each pair of transmitting nodes, wherein the estimating of the distance between each pair of transmitting nodes is performed using a corresponding transmission score and a lookup table; generating an estimation of a position of the plurality of transmitting nodes using the plurality of estimated distances; providing the generated estimation.

21 Claims, 3 Drawing Sheets

(51) Int. Cl.
  *H04B 17/27*   (2015.01)
  *H04B 17/318*   (2015.01)
  *G01S 11/06*   (2006.01)
  *H04W 28/02*   (2009.01)
  *G01S 5/14*   (2006.01)

(58) Field of Classification Search
  USPC ....... 455/456.5, 456.1, 453, 418, 435.1, 511, 455/444
  See application file for complete search history.

(56) References Cited

U.S. PATENT DOCUMENTS

| | | | |
|---|---|---|---|
| 10,359,503 B2 | 7/2019 | Igura | |
| 10,991,242 B2 * | 4/2021 | Taylor | H04Q 9/00 |
| 2008/0261613 A1 | 10/2008 | Anderson et al. | |
| 2010/0142445 A1 * | 6/2010 | Schlicht | H04W 4/20 370/328 |
| 2015/0277428 A1 * | 10/2015 | Dackefjord | G07C 9/00309 700/180 |
| 2018/0286158 A1 * | 10/2018 | Dackefjord | G07C 9/28 |
| 2020/0229206 A1 * | 7/2020 | Badic | H04W 16/32 |
| 2021/0182064 A1 * | 6/2021 | Kara | G06F 16/221 |

OTHER PUBLICATIONS

Chiang, M. et al. "Fog and IoT: An Overview of Research Opportunities", 2016, IEEE Internet of Things Journal, 3:6, pp. 854-864.

Dwivedi, A. et al. "Performance Analysis of Range Free Localization Methods for Wireless Sensor Networks", 2017, 4th IEEE International Conference on Signal Processing, Computing, and Control (ISPCC 2k17), pp. 521-526.

Gui, L. et al. "Improvement of range-free localization technology by a novel DV-hop protocol in wireless sensor networks", 2015, Ad Hoc Networks, 24, pp. 55-73.

Khan, S. et al., "WiFi-Based Positioning Algorithm for Indoor Environment using 802.11 Standards", 2014, International Journal of Scientific & Engineering Research, 5:3, pp. 1-7.

Malajner, M. et al. "Angle of Arrival Estimation using a Single Omnidirectional Rotatable Antenna", 2012 IEEE International Conference on Wireless Information Technology and Systems (ICWITS), vol. 12, pp. 1-4.

Moscibroda, T. et al. "Virtual Coordinates for Ad hoc and Sensor Networks", 2004, Proceedings of the 2004 Joint Workshop on Foundatoins of Mobile Computing (DIALM-POMC), pp. 1-8.

Niculescu, D. et al. "DV Based Positioning in Ad Hoc Networks" 2003, Telecommunication Systems, 22:1-4, pp. 267-280.

Paul, A.K. et al., "Localization in Wireless Sensor Networks: A Survey on Algorithms, Measurmenet Techniques, Applications, and Challenges", 2017, J. Sens. Actuator Netw>, 6:24, pp. 1-23.

Wifi Signal in iOS? 2017, URL: <https://forums.developer.apple.com/thread/78559>; Retrieved on Mar. 31, 2021; Retrieved from Internet.

Xu, L.D. et al. "Internet of Things in Industries: A Survey", 2014, IEEE Transactions on Industrial Informatics, 10:4, pp. 2233-2243.

Zaidi, S. et al. "Accurate Range-Free Localization in Multi-Hop Wireless Sensor Networks", 2016, IEEE Transactions on Communications, 64:9, pp. 3886-3900.

Zhang, Z., et al. "Localization in wireless sensor networks with mobile anchor nodes", 2007, Qinghua Daxue Xuebao/Journal of Tsinghua University, 47(4), pp. 1187-1197.

PCT/IB2019/055225, International Search Report, dated Nov. 13, 2019.

* cited by examiner

METHOD AND SYSTEM FOR DETERMINING A POSITION OF A PLURALITY OF TRANSMITTING NODES

CROSS-REFERENCE TO RELATED APPLICATIONS

This application claims priority on U.S. Provisional Application No. 62/688,736, filed on Jun. 22, 2018.

FIELD

The invention relates to data processing. More precisely, the invention pertains to a method and system for determining a position of a plurality of transmitting nodes.

BACKGROUND

The world gets more and more populated by smart agents of all kinds, from smart vehicles to mobile or wearable devices, from drones to smart tags.

Such widespread sensing, storage and computing capabilities at the edge and Internet ecosystem are naturally leveraged by Artificial Intelligence (AI) applications to automate and optimize our lives in the most varied domains, e.g., smart-home, smart-building, industry 4.0, construction 4.0, smart-cities, etc. (see L. D. Xu, W. He, and S. Li. Internet of things in industries: A survey. IEEE Transactions on Industrial Informatics, 10(4):2233-2243, November 2014 and M. Chiang and T. Zhang. Fog and iot: An overview of research opportunities. IEEE Internet of Things Journal, 3(6):854-864, December 2016.)

Autonomous applications aiming to optimize and automate processes may require the smart interaction among multiple smart agents. The interaction may be triggered/driven by different types of metrics, measures and actionable-insights derived in real-time from the surrounding environment.

Location-related aspects, e.g., proximity indicators and absolute/relative location coordinates, are among the key factors leveraged to implement smart applications for both outdoor and indoor environments.

The capacity of geo-locating the elements of interest with enough accuracy affects the performance of the smart applications running above. Phenomena such as signal multipath, shadowing and attenuation make geo-location within indoor environments more challenging than in outdoor scenarios (See A. Paul and T. Sato. Localization in Wireless Sensor Networks: A Survey on Algorithms, Measurement Techniques, Applications and Challenges. Journal of Sensor and Actuator Networks, 6(4):24, October 2017).

It will be appreciated that geo-location methodologies can be categorized across two main classes, i.e., range-based and range-free (See A. Paul and T. Sato. Localization in Wireless Sensor Networks: A Survey on Algorithms, Measurement Techniques, Applications and Challenges. Journal of Sensor and Actuator Networks, 6(4):24, October 2017.)

Methods falling within the first class, i.e., range-based, relies on the elaboration of measures directly related to the received signals, e.g., signal strength.

Methods and apparatus for collaborative relative localization in heterogeneous ecosystems and metrics which are directly related to the signal emitted by the tracked element (See A. Paul and T. Sato. Localization in Wireless Sensor Networks: A Survey on Algorithms, Measurement Techniques, Applications and Challenges. Journal of Sensor and Actuator Networks, 6(4):24, October 2017.) Examples of such factors are the Time Of Arrival (TOA) (See Z. Qu, Y. Chen, and G. Wu. CN106970353A—Communication base station-based three-dimensional positioning tracking and trajectory calculation method, 2017), Received Signal Strength Indicator (RSSI) (See J. Blumenthal, F. Reichenbach, and D. Timmermann. Minimal Transmission Power vs. Signal Strength as Distance Estimation for Localization in Wireless Sensor Networks. In 2006 3rd Annual IEEE Communications Society on Sensor and Ad Hoc Communications and Networks, pages 761-766. IEEE, 2006 and S. Khan, A. Akram, and S. Usman. Wi-Fi Based Positioning Algorithm for Indoor Environment using 802.11 Standards. International Journal of Scientific & Engineering Research, 5(3):279-283, 2014), Angle Of Arrival (AOA) (See M. Kotaru, K. Joshi, D. Bharadia, and S. Katti. SpotFi. In Proceedings of the 2015 ACM Conference on Special Interest Group on Data Communication—SIGCOMM '15, pages 269-282, New York, N.Y., USA, 2015. ACM Press), Time Difference Of Arrival (TDOA) (See R. J. Anderson and M. L. Ward. US20080261613A1—Sparsed U-TDOA Wireless Location Networks, 2008) and boolean connectivity indicator (See M. E. Davis, R. Nair, J. O'Sullivan, C. Paretti, C. W. Higgins, and O. Zaltzman. U.S. Pat. No. 8,045,482B2—Location tracking based on proximity-based ad hoc network, 2011).

Due to software limitations—absence of APIs offered by the operating system (See Apple Developer Forums—WiFi Signal in iOS? https://forums.developer.apple.com/thread/78559, 2017. [Online; accessed 21-May-2018])—or to specific hardware requirements (See M. Malajner, Z. Cucej, and D. Gleich. Angle of arrival estimation using a single omnidirectional rotatable antenna. In 2012 IEEE International Conference on Wireless Information Technology and Systems (ICWITS), volume 12, pages 1-4. IEEE, November 2012), the information demanded by range-based methods may not be available which is a limitation.

Practically speaking, in some settings, it is impossible to gain access to sender or receiver devices. In other settings, single or multiple sensors or receiver devices are shielded in the operating system (OS) from programmers, and are used in a black-box mode, with limited or no possibility to access or program.

Range-free approaches offer a valid alternative when information characterizing the received signals cannot be leveraged. A subset of these solutions exploits GPS or other Global Navigation Satellite Systems (GNSS) to geo-locate the elements of interest (See S. Qiu, Y. Zhong, H. Liu, L. Sun, M. Zhou, C. Zhang, Y. Jin, and H. Chen. CN104828698A—Ad Hoc network-based crane automatic cruising system of Bei-dou positioning system, and method thereof, 2017), or at least a part of them (See Z. Zhang, Z. Sun, G. Wang, R. Yu, and S. Mei. Localization in wireless sensor networks with mobile anchor nodes. Qinghua Daxue Xuebao/Journal of Tsinghua University, 47(4):1187-1197, 2007.)

When the location of a subset of sensing/tracking nodes is known (possibly through GPS), network topology features like the hop distance between anchors and tracked nodes are elaborated to geo-locate of the tracked elements (See L. Gui, T. Val, A. Wei, and R. Dalce. Improvement of range-free localization technology by a novel DV-hop protocol in wireless sensor networks. Ad Hoc Networks, 24(PB):55-73, January 2015, D. Niculescu and B. Nath. DV Based Positioning in Ad Hoc Networks. Telecommunication Systems, 22(1/4):267-280, 2003 and T. Moscibroda, R. O'Dell, M. Wattenhofer, and R. Wattenhofer. Virtual coordinates for ad hoc and sensor networks. Proceedings of the 2004 joint workshop on Foundations of mobile computing (DIALM-POMC), pages 1-8, 2004).

However, network topology features like the average hop-distance may not be robust enough to guarantee accurate geo-localization (e.g., indoor geo-localization, short distances between nodes, etc.) (See S. Zaidi, A. El Assaf, S. Affes, and N. Kandil. Accurate Range-Free Localization in Multi-Hop Wireless Sensor Networks. IEEE Transactions on Communications, 64(9):3886-3900, September 2016) which is a drawback.

Moreover, it is not always possible to rely on the increased accuracy obtained by including GPS measures in the core of range-free solutions: GPS signal may be weak or absent (e.g., indoor locations), as well as GPS-related hardware may not be available due to limited computation capabilities or energy awareness aspects (See A. Dwivedi and P. R. Vamsi. Performance analysis of range free localization methods for wireless sensor networks. In 2017 4th International Conference on Signal Processing, Computing and Control (ISPCC), pages 521-526. IEEE, September 2017.)

There is a need for a method and a system that will overcome at least one of the above-identified limitations.

Features of the invention will be apparent from review of the disclosure, drawings and description of the invention below.

BRIEF SUMMARY

According to a broad aspect, there is disclosed a method for estimating a position of a plurality of transmitting nodes, the method comprising installing a telecommunication application in each of the plurality of transmitting nodes forming a virtual communication network; transmitting a plurality of data packets, each data packet transmitted between a pair of transmitting nodes; generating a plurality of transmission quality coefficients using the plurality of data packets, each transmission quality coefficient indicative of a quality of transmission between a given pair of transmitting nodes; determining a corresponding plurality of transmission scores using the generated plurality of transmission quality coefficients and data associated with each of the plurality of transmitting nodes, each transmission score associated with a given pair of transmitting nodes; estimating a distance between each pair of transmitting nodes using the telecommunication application, wherein the estimating of the distance between each pair of transmitting nodes is performed using a corresponding transmission score and a lookup table; generating an estimation of a position of the plurality of transmitting nodes using the plurality of estimated distances; providing the generated estimation of the position of the plurality of transmitting nodes; and wherein the lookup table associates a transmission score with a corresponding distance.

In accordance with an embodiment, the virtual communication network is a virtual ad-hoc telecommunication network (MANET) formed by the plurality of transmitting nodes.

In accordance with an embodiment, each transmitting node is one of a mobile node and a fixed node.

In accordance with an embodiment, the transmitting of the plurality of data packets comprises generating data packets at a constant frequency between any couple of interconnected transmitting nodes.

In accordance with an embodiment, the data packets are generated between any couple of interconnected transmitting nodes that are direct neighbors in the virtual communication network.

In accordance with an embodiment, the transmitting of the plurality of data packets comprises generating data packets randomly in time according to a probability distribution.

In accordance with an embodiment, the transmission quality coefficients comprise quality of service (QoS) metrics.

In accordance with an embodiment, the quality of service (QoS) metrics is selected from a group consisting of a packet loss percentage, a path latency and a jitter.

In accordance with an embodiment, each transmission quality coefficient indicative of a quality of transmission between a given pair of transmitting nodes is generated by a receiving node of the given pair of transmitting node.

In accordance with an embodiment, the determining of a corresponding plurality of transmission scores comprises combining the generated plurality of transmission quality coefficients and data associated with the plurality of transmitting nodes.

In accordance with an embodiment, the data associated with the plurality of transmitting nodes comprises information contained in a header of a corresponding received packet.

In accordance with an embodiment, the information data is selected from a group consisting of a nominal maximum transmission range of network interfaces of transit nodes, corresponding intermediate transmission scores of intermediate nodes and on range-based data.

In accordance with an embodiment, the determining of a corresponding plurality of transmission scores using the generated plurality of transmission quality coefficients and data associated with each of the plurality of transmitting nodes comprises correlating a QoS metric to an estimated value of Signal to Noise Ratio (SNR).

In accordance with an embodiment, the method further comprises amending the lookup table over time.

In accordance with an embodiment, the generating of the estimation of a position of the plurality of transmitting nodes is performed by a given transmitting node of the plurality of transmitting nodes.

In accordance with an embodiment, the generating of the estimation of a position of the plurality of transmitting nodes is performed by another processing unit.

In accordance with an embodiment, the generated estimation of the position of the plurality of transmitting nodes is provided to a given processing unit.

In accordance with an embodiment, the providing of the generated estimation of the position of the plurality of transmitting nodes comprises providing a corresponding position of a corresponding transmitting node to the corresponding transmitting node.

In accordance with a broad aspect, there is disclosed a method for estimating a position of a plurality of transmitting nodes, the method comprising generating a plurality of transmission quality coefficients using a plurality of data packets transmitted over a virtual communication network formed by the plurality of transmitting nodes, each transmission quality coefficient indicative of a quality of transmission between a given pair of transmitting nodes; determining a corresponding plurality of transmission scores using the generated plurality of transmission quality coefficients and data associated with each of the plurality of transmitting nodes, each transmission score associated with a given pair of transmitting nodes; estimating a distance between each pair of transmitting nodes using the telecommunication application, wherein the estimating of the distance between each pair of transmitting nodes is performed using a corresponding transmission score and a lookup table; generating an estimation of a position of the plurality of transmitting nodes using the plurality of estimated distances; providing the generated estimation of the position of the plurality of transmitting nodes; and wherein the virtual communication network is generated by installing a telecommunication application in each of the plurality of transmitting nodes; further wherein the lookup table associates a transmission score with a corresponding distance.

In accordance with a broad aspect, there is disclosed a non-transitory computer readable storage medium for storing computer-executable instructions which, when executed, cause a processing device to perform a method for estimating a position of a plurality of transmitting nodes, the method comprising installing a telecommunication application in each of the plurality of transmitting nodes forming a virtual communication network; transmitting a plurality of data packets, each data packet transmitted between a pair of transmitting nodes; generating a plurality of transmission quality coefficients using the plurality of data packets, each transmission quality coefficient indicative of a quality of transmission between a given pair of transmitting nodes; determining a corresponding plurality of transmission scores using the generated plurality of transmission quality coefficients and data associated with each of the plurality of transmitting nodes, each transmission score associated with a given pair of transmitting nodes; estimating a distance between each pair of transmitting nodes using the telecommunication application, wherein the estimating of the distance between each pair of transmitting nodes is performed using a corresponding transmission score and a lookup table; generating an estimation of a position of the plurality of transmitting nodes using the plurality of estimated distances; providing the generated estimation of the position of the plurality of transmitting nodes; and wherein the lookup table associates a transmission score with a corresponding distance.

In accordance with a broad aspect, there is disclosed a transmitting node comprising a central processing unit; a communication port operatively connected to the central processing unit, the communication port for operatively connecting the transmitting node to a plurality of transmitting nodes via a data network; a memory unit comprising a telecommunication application for forming a virtual communication network between the plurality of transmitting nodes; an application for estimating a position of a plurality of transmitting nodes, the application comprising: instructions for generating a plurality of transmission quality coefficients using a plurality of data packets transmitted over the virtual communication network formed by the plurality of transmitting nodes, each transmission quality coefficient indicative of a quality of transmission between a given pair of transmitting nodes; instructions for determining a corresponding plurality of transmission scores using the generated plurality of transmission quality coefficients and data associated with each of the plurality of transmitting nodes, each transmission score associated with a given pair of transmitting nodes; instructions for estimating a distance between each pair of transmitting nodes using the telecommunication application, wherein the estimating of the distance between each pair of transmitting nodes is performed using a corresponding transmission score and a lookup table; instructions for generating an estimation of a position of the plurality of transmitting nodes using the plurality of estimated distances; instructions for providing the generated estimation of the position of the plurality of transmitting nodes and wherein the lookup table associates a transmission score with a corresponding distance.

The processing steps of the method disclosed include, in one embodiment, i) generating a virtual network interconnecting all the involved elements, i.e., tracked and sensing, ii) a periodic generation of network packets tailored to evaluate the network state and collect network information, iii) a computation of a multi-dimensional gradient, also referred to as a transmission score, based on the collected network measures and network information, iv) a transformation of the transmission scores into relative distance estimations within the corresponding pair of tracked and sensing elements, v) the interpolation of all the estimated distance values to geolocate the tracked elements according to a common system of coordinates in 3 axes.

It will be appreciated that the method disclosed therefore transforms abstract QoS metrics, as well as abstract node information extracted from a virtual network into a transmission score which is directly correlated to the relative distance between the source and the destination of a traffic demand transmitted over the virtual network itself. This enables an absolute distance to be estimated or established using a conversion factor or algorithm.

In one embodiment, transmission score adjustments may be done through data fusion within each of the transmitting nodes. It will also be appreciated that the abstract QoS metric variation, as well as the direction of variation, may be included to map or predict the representation within a 3D space.

It will be appreciated that an object of the invention is to provide a method for efficiently geolocalizing elements of interest within a 3D space.

It will be appreciated that another object of the invention is to enable a geolocalization independently of a mobility pattern characterizing both sensing and tracked devices. The method disclosed herein is compatible with both moving and fixed sensing devices, as well as with both moving and fixed tracked devices. Sensing and tracking may also be done on the same device.

The method disclosed herein is of great advantage for various reasons.

A first advantage of the method disclosed is that it provides an efficient geolocalization of elements of interest within a 3D space.

A second advantage of the method disclosed is that it does not require a modification of the operating system of the transmitting nodes.

A third advantage of the method disclosed is that very limited or no information of the network physical layer is required.

A fourth advantage of the method disclosed is that it enables a 3D geo-localization in presence of a highly heterogeneous environment. The heterogeneity concerns both the sensing (tracking) infrastructure and the tracked elements. Heterogeneity is overcome by considering virtual abstractions independent of the underlying hardware and software technology.

A fifth advantage of the method disclosed is that it uses a virtual communication network which reduces an amount of information required concerning the underlying software and physical layer to a very limited subset of data easy accessible of any device.

Another advantage of the method disclosed is that it is compatible with three class of mobility scenarios concerning the transmitting nodes, i.e., i) only static transmitting nodes, ii) coexistence of both static and mobile transmitting nodes, iii) only mobile transmitting nodes.

BRIEF DESCRIPTION OF THE DRAWINGS

In order that the invention may be readily understood, embodiments of the invention are illustrated by way of example in the accompanying drawings.

Figure 1:
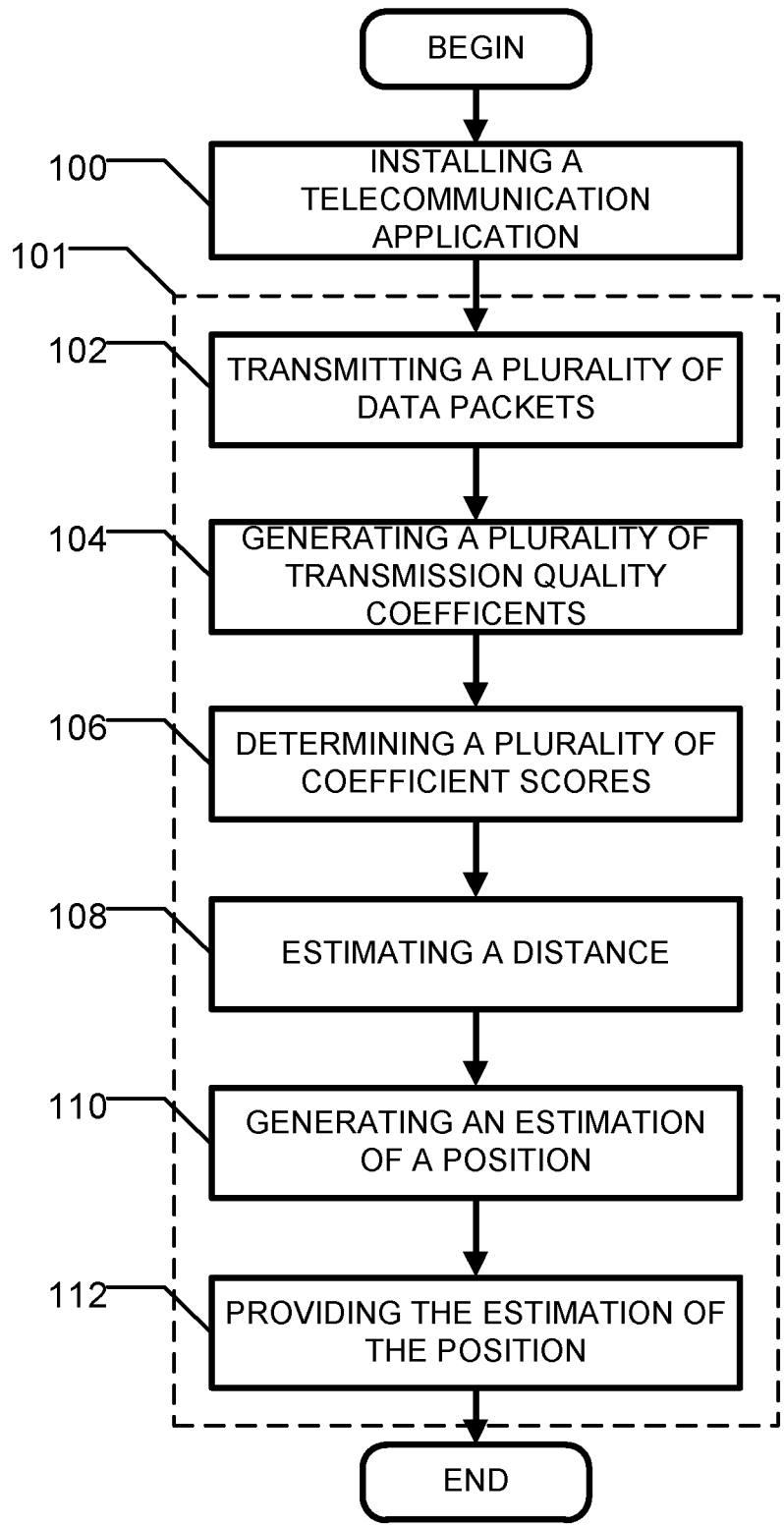
FIG. 1 is a flowchart which shows an embodiment of a method for estimating a position of a plurality of transmitting nodes.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a method and a system for estimating a position of a plurality of transmitting nodes.

It will be appreciated that the method disclosed herein provides a range-free and GPS-free 3D geolocalization. As explained further below, it overcomes the accuracy limitations of state-of-the-art range-free methods based on network topology features.

It will be appreciated that geolocating the transmitting nodes that populate an area of interest may be critical to run a wide range of smart and autonomous applications, e.g., automatic light activation triggered by user positions or indoor navigation services for clients looking for specific products within a large store, etc.

The method disclosed is also critical for areas where traditional GPS signals might be unavailable, such as space and aerospace sectors or for indoor applications.

It will be also appreciated that the method disclosed herein provides an accurate 3D geolocation in scenarios where range-based approaches cannot be implemented due to hardware/software limitations and traditional range-free solutions based on GPS or connectivity graphs are not available or accurate enough.

As further disclosed below, the 3D geo-localization process is based on the ability of interconnecting all the involved devices, both tracking (sensing) and tracked, on a virtual ad-hoc communication network. It will be appreciated that, while this may still be possible in an embodiment, the virtual communication network is not used for traditional communication purposes, i.e., to carry the information generated by the application running.

Now referring to FIG. 1, there is shown an embodiment of a method for estimating a position of a plurality of transmitting nodes.

It will be appreciated that the method disclosed in FIG. 1 may be implemented in various ways.

Figure 2:
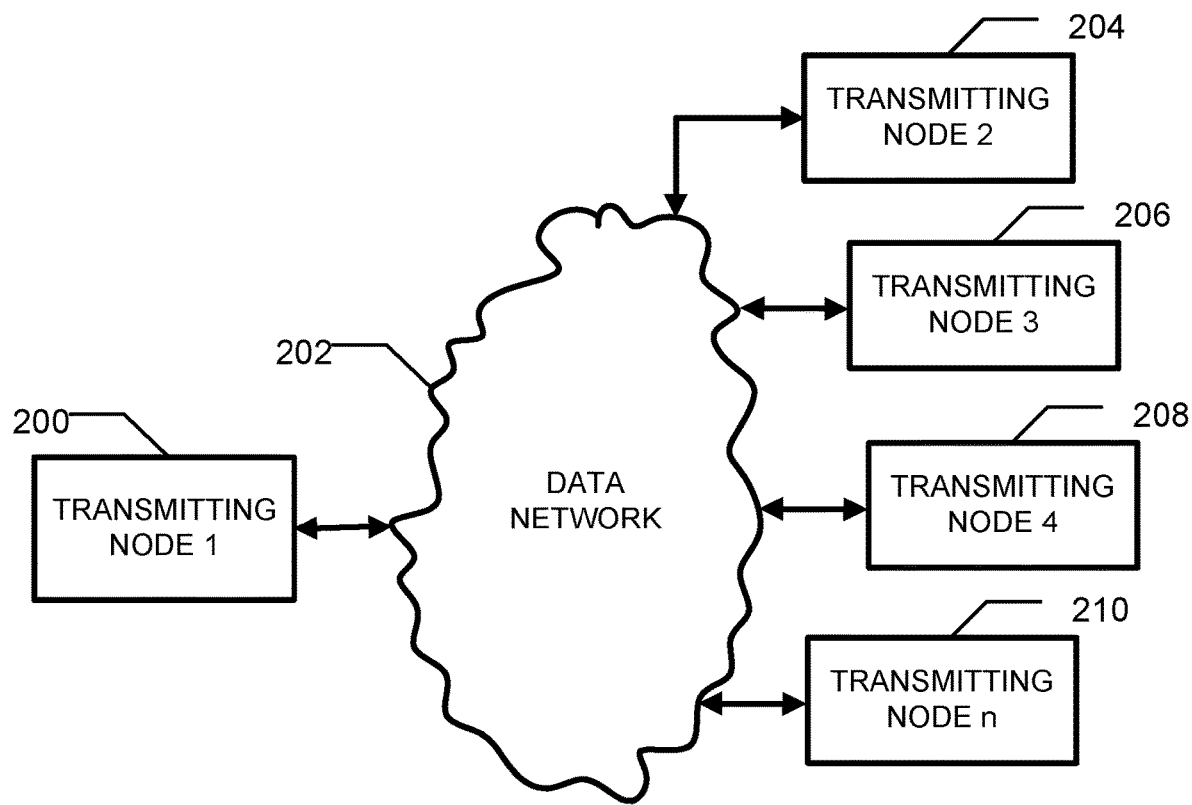
FIG. 2 is a diagram which shows an embodiment of a system in which the method for estimating a position of a plurality of transmitting nodes may be implemented.

In fact and now referring to FIG. 2, there is shown an embodiment of a system disclosing how the method for estimating a position of a plurality of transmitting nodes may be implemented.

In this embodiment, the system comprises a plurality of transmitting nodes and a data network 202.

It will be appreciated that a transmitting node may be defined as any type of device equipped with at least one communication interface, also referred to as a communication port. In one embodiment, the transmitting node also comprises a central processing device operatively connected to the communication port and a memory unit operatively connected to the central processing device.

For instance and in one embodiment, the plurality of transmitting nodes may comprise a plurality of drones, each drone having a communication interface. In such embodiment, the method disclosed herein may be used for determining a position for each drone of the plurality of drones.

It will be appreciated that in a further embodiment at least one of the plurality of transmitting nodes may be advantageously integrated with existing energy consuming or providing devices, such as for instance an electrical plug, a lightbulb, a power cord, etc. In such embodiment, the transmitting node will benefit from the energy available at the existing energy device. The skilled addressee will appreciate that this will be of great advantage for enhancing the size of the network and the accuracy. In such embodiment, the method may be used for determining a position of individuals equipped with a smartphone or a wearable device within an indoor environment.

In another embodiment, the plurality of transmitting nodes may comprise a set of nodes with sensors, such as vital signs monitoring sensors, with telecommunication capabilities (e.g., Bluetooth™, Wifi™, etc) that can deliver information including data and relative or absolute geopositioning that will enhance operations (for instance victim rescue within an emergency response operation), and connect all information to other nodes (i.e. mobile devices) for operation management (visualization and decision making through smart devices). It will be appreciated by the skilled addressee that this information may also be used to move nodes, which may be human agents or robotic agents, for enhanced operations and optimized workflow management which is of great advantage.

It will be appreciated that in another embodiment, the plurality of transmitting nodes geopositions may be advantageously used to authenticate a data source.

In another embodiment, the geolocation of transmitting nodes may help to establish a direct optimal line of transfer of information related to quality of service (QoS) and the dynamic aspect of mobile nodes. In such context, the routing for data transfers may take into account the QoS and the dynamic aspects related to the node positions.

In another alternative embodiment, the relative geolocation and the QoS may be used to secure the network by recognizing patters and identifying abnormalities using artificial intelligence techniques, such as deep learning using, among others, geolocation or QoS data for intrusion detection.

It will be further appreciated that the method disclosed herein is especially of benefit for all off-the-shelf devices that might have heterogeneous interfaces controlled by different types application programming interfaces (APIs).

It will be appreciated that the transmitting nodes are selected from a group consisting of tracked nodes and sensing nodes. It will be further appreciated that a transmitting node may be both a tracked node and a sensing node.

It will be appreciated by the skilled addressee that the transmitting nodes may be located indoor or outdoor.

The skilled addressee will appreciate that various alternative embodiments may be provided for the transmitting nodes.

In the diagram shown in FIG. 2, the plurality of transmitting nodes comprises transmitting node 1 200, transmitting node 2 204, transmitting node 3 206, transmitting node 4 208 and transmitting node n 210. The skilled addressee will appreciate that any number of transmitting nodes may be used.

It will be appreciated that each of the transmitting node 1 200, the transmitting node 2 204, the transmitting node 3 206, the transmitting node 4 208 and the transmitting node n 210 is one of a mobile node and a fixed node.

It will be appreciated that the mobile node is a transmitting node that may move while a fixed node is a transmitting node that does not move.

Moreover, it will be appreciated that each of the transmitting node 1 200, the transmitting node 2 204, the transmitting node 3 206, the transmitting node 4 208 and the transmitting node n 210 may be at least one of a sensing node and a tracked node as explained above.

It will be appreciated that a tracked node is defined as a transmitting node for which a position has to be determined.

It will be appreciated that a sensing node is defined as a transmitting node which is used for tracking a tracked node.

It will be appreciated that while the plurality of transmitting nodes is operatively connected using the data network 202, in another embodiment, the plurality of transmitting nodes is operatively connected using more than one data network. In such embodiment, each data network may or may not operate according to a given communication protocol. The communication protocol may be selected from a group consisting of IEEE 802.11abgn/ac in ad-hoc (IBSS) mode, IEEE 802.11abgn/ac in access point and station modes, DIGI Mesh, IEEE 802.15 related protocols, 3G/4G/5G+, etc. The skilled addressee will appreciate that the communication protocol used in a given data network depends on the communication interface of the transmitting nodes defining the data network.

Now referring back to FIG. 1 and according to processing step 100, a telecommunication application is installed.

It will be appreciated that the telecommunication application is installed in each of the plurality of transmitting nodes.

It will be appreciated that the purpose of installing the telecommunication application is to form a virtual communication network with a plurality of transmitting nodes.

In one embodiment, the virtual communication network is a virtual mobile ad-hoc telecommunication network (MANET) formed by the plurality of transmitting nodes.

As known to the skilled addressee, a virtual mobile ad-hoc telecommunication network (MANET) is a popular solution to interconnect, for communication purposes, transmitting nodes among each other (see S. Qiu, Y. Zhong, H. Liu, L. Sun, M. Zhou, C. Zhang, Y. Jin, and H. Chen. CN104828698A—Ad Hoc network-based crane automatic cruising system of Beidou positioning system, and method thereof, 2017 and C. P. Ricci. US20140309935A1—Proactive machine learning in a vehicular environment, 2014.)

However, it will be appreciated that in this embodiment, the virtual mobile ad-hoc telecommunication network is used for enabling a geolocalisation as further explained below.

It will be appreciated that the plurality of transmitting nodes may define a highly heterogeneous environment. In order to guarantee the compatibility with heterogeneous sets of both the tracked devices and the sensing devices in terms of both hardware and software components, the virtual communication network, is advantageously implemented as a communication middleware running in the user space of the underlying devices (See P. Garcia Lopez, R. Gracia Tinedo, and J. M. Banu's Alsina. Moving routing protocols to the user space in MANET middleware. Journal of Network and Computer Applications, 33(5):588-602, September 2010). This prevents the need to modify the operating system of the underlying devices, which is a great advantage.

It will be appreciated that further information on how a virtual MANET middleware in the user space may be used to interconnect off-the-shelf smart-phones has been disclosed for instance by T. Zhuang, P. Baskett, and Y. Shang in "Managing Ad Hoc Networks of Smartphones," *Int. J. Inf. Educ. Technol.*, vol. 3, no. 5, pp. 540-546, 2013.

It will therefore be appreciated that a virtual communication network is built among a set T of tracked nodes with a set S of sensing (tracking) nodes over the virtual communication network. The virtual communication network will enable communication traffic among all the transmitting nodes belonging to the set S u T. It will be appreciated that a sensing node may be, at the same time, a tracked node.

It will be further appreciated that the characterization of such traffic along with relevant-related metrics is key for performing the 3D geolocalization process, as further explained below.

In one embodiment, the telecommunication application is a mobile app coded in Objective-C and compatible with any iOS™ devices such as for instance an iPhone™, an iPad™ or an iPod™.

In another alternative embodiment, the telecommunication application is a Python application compatible with any Linux-based system provided with a Python interpreter.

The skilled addressee will appreciate that various alternative embodiments may be possible for the telecommunication application.

According to processing step 102, a plurality of data packets are transmitted. In fact, it will be appreciated that each data packet, also referred to as a network packet, is transmitted between a pair of transmitting nodes.

As further explained below, the network packets are used for the purpose of evaluating a network state, collect network information, and distribute geolocalization information among the tracking nodes.

In one embodiment, the network packets are periodically generated, i.e., the network packets are generated at a constant frequency, between any couple of interconnected transmitting nodes (o, d) $\forall o \in S \cup T$, $\forall d \in S$.

In another embodiment, the network packets are periodically generated, i.e., the network packets are generated at a constant frequency, between any couple of transmitting nodes (o, d) $\forall o \in S \cup T$, $\forall d \in S$ that are direct neighbors on the virtual network.

In an alternative embodiment, the network packets are generated randomly in time, according to a given probability distribution.

It will be appreciated that in one embodiment, the network packets are routed from a source to all the relevant destination nodes by transmitting toward a broadcast or multicast address by means of a gossip approach.

In another embodiment, with the intent of reducing interference and congestion, the neighboring nodes towards which transmitting the packets by means of gossip are selected among those nodes belonging to one (or multiple) trees interconnecting all the nodes $o \in S \cup T$. It will be appreciated that complexity can be reduced by partitioning the set $S \cup T$ in multiple sub-domains based on hop-proximity, so that one or multiple trees can be computed per each sub-domain. These trees can be computed by running standard proactive routing protocols such as OSPF, RIP and related variants.

It will be appreciated that information characterizing the corresponding routing path is incrementally added to the header of the network packets as they are forwarded from transmitting node to transmitting node toward their destination.

It will be also appreciated that each network packet comprises specific information added to the header of the network packets by each transit transmitting node.

The information may comprise but are not limited to i) a nominal maximum transmission range of the underlying network interface, ii) an ID of the transmitting node, iii) values retrieved by other embedded sensors such as accelerometers and barometers, iv) most recent gradient for the last-hop and v) time stamps, vi) gradient absolute variation and direction.

It will be appreciated that in one embodiment, the network packets transmitted by a specific node are destined only to the direct neighboring nodes.

In another embodiment, the subset of neighboring nodes towards which transmitting the packets can be further reduced to the set of direct neighboring nodes with respect to the routing trees computed to reduce the number of network links.

According to processing step 104, a plurality of transmission quality coefficients is generated.

It will be appreciated that a transmission quality coefficient is indicative of a quality of a transmission for different types of packet flows between a given pair of transmitting nodes.

In fact, it will be appreciated that the transmission quality coefficients are generated using the plurality of data packets.

Example of transmission quality coefficients include Quality of Service (QoS) metrics, such as for instance percentage of packet loss percentage, path latency, jitter, related to different types of transmission flows (e.g., packets of different dimensions), etc.

The skilled addressee will appreciate that various alternative embodiments may be used for generating the transmission quality coefficients. For instance, the transmission quality coefficients may be generated by normalizing each QoS indicator considered per each class of generated packets (or generated packet flows), e.g., average latency for the flow of packets of 1 KB, jitter for the flow of packets of 10 KB, etc., with respect to a best value achieved when two transmitting nodes are in maximum proximity.

Moreover it will be appreciated that each transmission quality coefficient is generated by a corresponding receiving node of the corresponding pair of transmitting/receiving nodes in one embodiment.

According to processing step 106, a plurality of transmission scores are determined.

It will be appreciated that a transmission score can be referred to as a metric derived by combining, e.g., by doing a weighted average, of all the transmission coefficients.

It will be appreciated that the plurality of transmission scores is determined using the generated plurality of transmission quality coefficients and data associated with each of the plurality of transmitting nodes. Moreover, it will be appreciated that each transmission score is associated with a given pair of transmitting nodes.

For instance and in one embodiment, each network packet generated by a device $I \in S \cup T$ and received by a sensing device $j \in S$ triggers, at device j, the recalculation of a transmission score also, also referred to as a gradient.

In one embodiment, the transmission score is based on two factors: i) Quality of Service (QoS) metrics (e.g., percentage of packet loss percentage, path latency, etc.) observed on the virtual communication network for the packets of traffic demand $(i, j) \in S \cup T \times S$, as well as ii) the information contained in the header of the received packet, e.g., nominal maximum transmission range of the network interfaces of the transit nodes, intermediate transmission scores of intermediate nodes, etc.

It will be appreciated that the transmission score may also be further based on range-based data, when this is available, from the transmitting nodes. As shown in Ernesto J. Rivera-Lara, et al. "Analysis of the Relationship between QoS and SNR for an 802.11 g WLAN." *Communication Theory, Reliability, and Quality of Service*, 2008. CTRQ '08. *International Conference on*. IEEE, 2008, it is possible to correlate a QoS measure to a specific value of Signal to Noise Ratio (SNR). The knowledge of signal strength values can be used to improve the SNR estimation done through QoS measure, which will be later exploited to estimate the relative distance between two transmitting nodes.

It will be also appreciated that correction strategies may be adopted to neutralize the impact of network congestion or radio interference on the transmission score computation.

The objective of such correction strategies is to guarantee that a transmission score degradation will be mainly due to the increased distance between tracked and sensing devices.

It will be appreciated that the transmission score may be determined according to various alternative embodiments.

Moreover, the determination of the transmission score may be performed by a given specific transmission node in one embodiment.

In an alternative embodiment, the transmission score is determined by directly correlating each specific QoS metric to an estimated value of Signal to Noise Ratio (SNR).

According to processing step 108, a distance is estimated.

It will be appreciated that the distance is estimated between each pair of transmitting nodes using the telecommunication application. Moreover, it will be appreciated that the estimating of the distance between each pair of transmitting nodes is performed using a corresponding transmission score and a lookup table.

The lookup table is used for providing a corresponding distance to a given transmission score.

It will be appreciated that the lookup table may be generated according to various embodiments.

In one embodiment, the lookup table is generated beforehand using experiments. In another embodiment, the lookup table is amended over time.

Accordingly and in one embodiment, the transmission scores which are computed by each sensing device j∈S with respect to any other device I∈S∪T from which it received a network packet, are therefore mapped into multi-dimensional value representing the estimated distance between j and i.

It will be appreciated that statistical, analytic and artificial intelligence (AI)-based approaches, such as for instance machine learning, deep learning, etc., may be used for that purpose.

Moreover and in one embodiment, the distance is determined by a given transmitting node. It will be appreciated that the lookup table may or may not be available at the given transmitting node determining the distance. In the case where the lookup table is not available at the given transmitting node, the lookup table is remotely accessed by the given transmitting node. This processing step may be performed according to various embodiments as known to the skilled addressee.

According to processing step 110, an estimation of a position is generated.

It will be appreciated that the estimation of a position may be generated using relative positions, i.e., various distances.

In fact, the estimated relative distance computed by each sensing node are shared within the virtual communication network to allow for the purpose of computing, through collaborative interpolation, the absolute geolocalization of all tracked and sensing elements with respect to a common system of reference in 3 axes.

It will be appreciated that the estimation of a position of the plurality of transmitting nodes is estimated using the plurality of estimated distances.

It will be appreciated that the estimation of the position of the plurality of transmitting nodes may be performed according to various embodiments.

In one embodiment, the estimation of the position of the plurality of transmitting nodes is performed by a given transmitting node of the plurality of transmitting nodes. In another embodiment, the estimation of a position of the plurality of transmitting nodes is performed by another processing unit. It will be appreciated that the processing unit may be of various types.

According to processing step 112, an estimation of a position is provided.

It will be appreciated that the estimation of the position may be performed according to various embodiments.

In one embodiment, the estimation of a position of the plurality of transmitting nodes is transmitted to a given processing unit.

In another embodiment, each estimation of a position of each of the plurality of transmitting nodes is provided to each corresponding transmitting node.

It will be appreciated that the method disclosed herein is of great advantage for various reasons.

It will be appreciated that the method disclosed herein may be used to also complement traditional range-based approaches. For instance, factors like Time Of Arrival (TOA), Received Signal Strength Indicator (RSSI), Angle Of Arrival (AOA), Time Difference Of Arrival (TDOA) and Boolean connectivity indicator may be used to complement the range-free approach when available. In this particular case, such information might be included in the header of the network packets to increase the precision of the 3D geolocalization process.

According to another embodiment, there is disclosed a method for estimating a position of a plurality of transmitting nodes, the method comprises generating a plurality of transmission quality coefficients using a plurality of data packets transmitted over a virtual communication network formed by the plurality of transmitting nodes, each transmission quality coefficient indicative of a quality of transmission between a given pair of transmitting nodes. The method further comprises determining a corresponding plurality of transmission scores using the generated plurality of transmission quality coefficients and data associated with each of the plurality of transmitting nodes, each transmission score associated with a given pair of transmitting nodes. The method further comprises estimating a distance between each pair of transmitting nodes using the telecommunication application, wherein the estimating of the distance between each pair of transmitting nodes is performed using a corresponding transmission score and a lookup table. The method further comprises generating an estimation of a position of the plurality of transmitting nodes using the plurality of estimated distances. The method further comprises providing the generated estimation of the position of the plurality of transmitting nodes. The virtual communication network is generated by installing a telecommunication application in each of the plurality of transmitting nodes and the lookup table associates a transmission score with a corresponding distance.

It will be appreciated that there is also disclosed a non-transitory computer readable storage medium for storing computer-executable instructions which, when executed, cause a processing device to perform a method for estimating a position of a plurality of transmitting nodes, the method comprising installing a telecommunication application in each of the plurality of transmitting nodes forming a virtual communication network; transmitting a plurality of data packets, each data packet transmitted between a pair of transmitting nodes; generating a plurality of transmission quality coefficients using the plurality of data packets, each transmission quality coefficient indicative of a quality of transmission between a given pair of transmitting nodes; determining a corresponding plurality of transmission scores using the generated plurality of transmission quality coefficients and data associated with each of the plurality of transmitting nodes, each transmission score associated with a given pair of transmitting nodes; estimating a distance between each pair of transmitting nodes using the telecommunication application, wherein the estimating of the distance between each pair of transmitting nodes is performed using a corresponding transmission score and a lookup table; generating an estimation of a position of the plurality of transmitting nodes using the plurality of estimated distances; providing the generated estimation of the position of the plurality of transmitting nodes and wherein the lookup table associates a transmission score with a corresponding distance.

Figure 3:
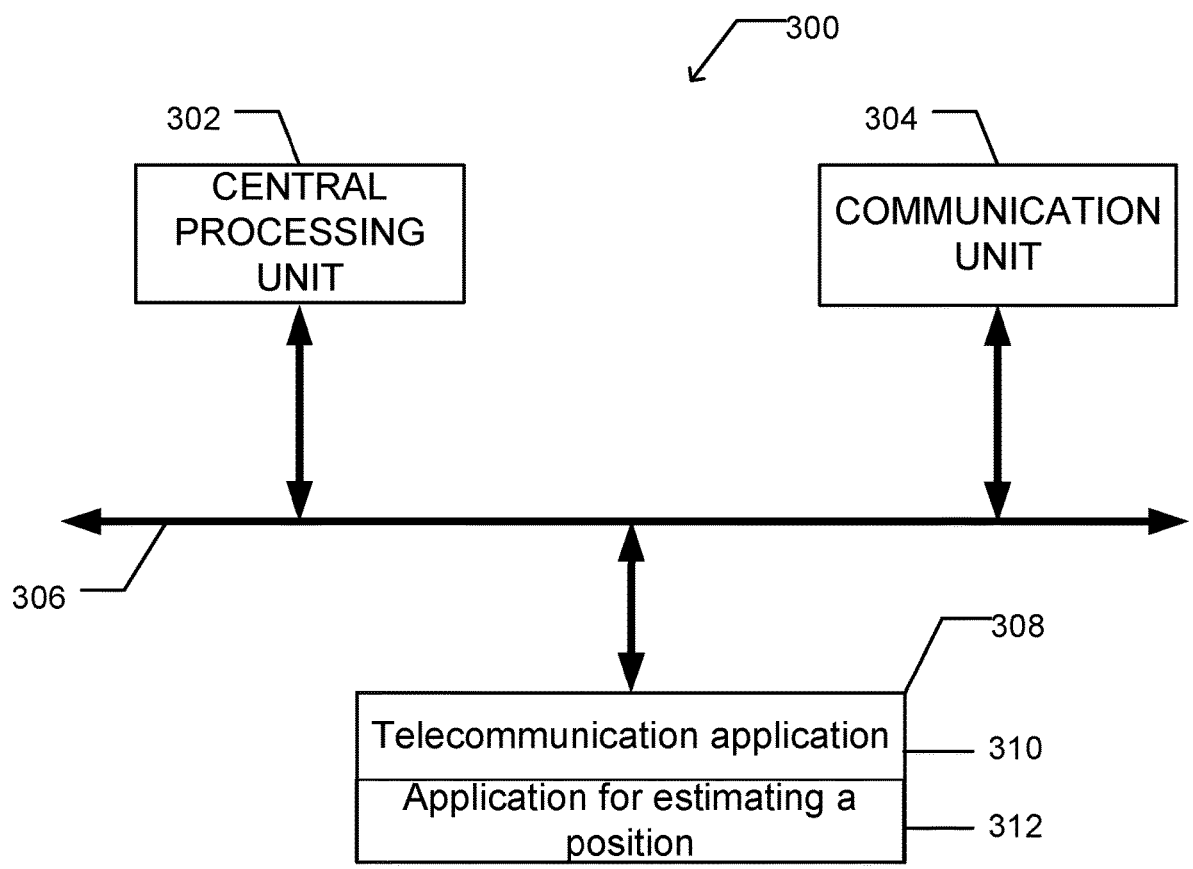
FIG. 3 is a diagram which shows an embodiment of a transmitting node which may be used in the method for estimating a position of a plurality of transmitting nodes.

In one embodiment, shown in FIG. 3, a transmitting node 300 comprises a central processing unit 302, a communication port 304 and a memory unit 308. As mentioned previously, the transmitting node 300 may be of various types.

The central processing unit 302 is operatively connected to the communication port 304 and to the memory unit 308 via a data bus 306.

The communication port 304 is used for operatively connecting the transmitting node 300 to a plurality of transmitting nodes, not shown, via a data network, also not shown.

The memory unit 308 comprises a telecommunication application 310. The telecommunication application 10 is used for forming a virtual communication network between the plurality of transmitting nodes.

The memory unit 308 further comprises an application 312 for estimating a position of a plurality of transmitting nodes.

The application 312 for estimating a position of a plurality of transmitting nodes comprises instructions for generating a plurality of transmission quality coefficients using a plurality of data packets transmitted over the virtual communication network formed by the plurality of transmitting nodes, each transmission quality coefficient indicative of a quality of transmission between a given pair of transmitting nodes.

The application 312 for estimating a position of a plurality of transmitting nodes further comprises instructions for determining a corresponding plurality of transmission scores using the generated plurality of transmission quality coefficients and data associated with each of the plurality of transmitting nodes, each transmission score associated with a given pair of transmitting nodes.

The application 312 for estimating a position of a plurality of transmitting nodes further comprises instructions for estimating a distance between each pair of transmitting nodes using the telecommunication application, wherein the estimating of the distance between each pair of transmitting nodes is performed using a corresponding transmission score and a lookup table.

The application 312 for estimating a position of a plurality of transmitting nodes further comprises instructions for generating an estimation of a position of the plurality of transmitting nodes using the plurality of estimated distances.

The application 312 for estimating a position of a plurality of transmitting nodes further comprises instructions for providing the generated estimation of the position of the plurality of transmitting nodes. It will be appreciated that the lookup table associates a transmission score with a corresponding distance. In one embodiment, the lookup table is comprised in the memory unit 308.

A first advantage of the method disclosed is that it provides an efficient geolocalization of elements of interest within a 3D space.

A second advantage of the method disclosed is that it does not modify the operating system of the transmitting nodes.

A third advantage of the method disclosed is that very limited or no information of the network physical layer is required.

A fourth advantage of the method disclosed is that it enables a 3D geo-localization in presence of a highly heterogeneous environment. The heterogeneity concerns both the sensing (tracking) infrastructure and the tracked elements. Heterogeneity is overcome by considering virtual abstractions independent of the underlying hardware and software technology.

A fifth advantage of the method disclosed is that it uses a virtual communication network which reduces an amount of information required concerning the underlying software and physical layer to a very limited subset of data easy accessible by any device.

Another advantage of the method disclosed is that it is compatible with three class of mobility scenarios concerning the transmitting nodes, i.e., i) only static transmitting nodes, ii) coexistence of both static and mobile transmitting nodes, iii) only mobile transmitting nodes.

CLAUSES

Clause 1. A method for estimating a position of a plurality of transmitting nodes, the method comprising:

installing a telecommunication application in each of the plurality of transmitting nodes forming a virtual communication network;

transmitting a plurality of data packets, each data packet transmitted between a pair of transmitting nodes;

generating a plurality of transmission quality coefficients using the plurality of data packets, each transmission quality coefficient indicative of a quality of transmission between a given pair of transmitting nodes;

determining a corresponding plurality of transmission scores using the generated plurality of transmission quality coefficients and data associated with each of the plurality of transmitting nodes, each transmission score associated with a given pair of transmitting nodes;

estimating a distance between each pair of transmitting nodes using the telecommunication application, wherein the estimating of the distance between each pair of transmitting nodes is performed using a corresponding transmission score and a lookup table;

generating an estimation of a position of the plurality of transmitting nodes using the plurality of estimated distances;

providing the generated estimation of the position of the plurality of transmitting nodes; and wherein the lookup table associates a transmission score with a corresponding distance.

Clause 2. The method as claimed in clause 1, wherein the virtual communication network is a virtual ad-hoc telecommunication network (MANET) formed by the plurality of transmitting nodes.

Clause 3. The method as claimed in any one of clauses 1 to 2, wherein each transmitting node is one of a mobile node and a fixed node.

Clause 4. The method as claimed in any one of clauses 1 to 3, wherein the transmitting of the plurality of data packets comprises generating data packets at a constant frequency between any couple of interconnected transmitting nodes.

Clause 5. The method as claimed in clause 4, wherein the data packets are generated between any couple of interconnected transmitting nodes that are direct neighbors in the virtual communication network.

Clause 6. The method as claimed in any one of clauses 1 to 3, wherein the transmitting of the plurality of data packets comprises generating data packets randomly in time according to a probability distribution.

Clause 7. The method as claimed in any one of clauses 1 to 6, wherein the transmission quality coefficients comprise quality of service (QoS) metrics.

Clause 8. The method as claimed in clause 7, wherein the quality of service (QoS) metrics is selected from a group consisting of a packet loss percentage, a path latency and a jitter.

Clause 9. The method as claimed in any one of clauses 1 to 8, wherein each transmission quality coefficient indicative of a quality of transmission between a given pair of transmitting nodes is generated by a receiving node of the given pair of transmitting node.

Clause 10. The method as claimed in any one of clauses 1 to 9, wherein the determining of a corresponding plurality of transmission scores comprises combining the generated plurality of transmission quality coefficients and data associated with the plurality of transmitting nodes.

Clause 11. The method as claimed in clause 10, wherein the data associated with the plurality of transmitting nodes comprises information data contained in a header of a corresponding received packet.

Clause 12. The method as claimed in claim 11, wherein the information data is selected from a group consisting of a nominal maximum transmission range of network interfaces of transit nodes, corresponding intermediate transmission scores of intermediate nodes, on range-based data.

Clause 13. The method as claimed in any one of clauses 1 to 12, wherein the determining of a corresponding plurality of transmission scores using the generated plurality of transmission quality coefficients and data associated with each of the plurality of transmitting nodes comprises correlating a QoS metric to an estimated value of Signal to Noise Ratio (SNR).

Clause 14. The method as claimed in any one of clauses 1 to 13, further comprising amending the lookup table over time.

Clause 15. The method as claimed in any one of clauses 1 to 14, wherein the generating of the estimation of a position of the plurality of transmitting nodes is performed by a given transmitting node of the plurality of transmitting nodes.

Clause 16. The method as claimed in any one of clauses 1 to 15, wherein the generating of the estimation of a position of the plurality of transmitting nodes is performed by another processing unit.

Clause 17. The method as claimed in any one of clauses 1 to 16, wherein the generated estimation of the position of the plurality of transmitting nodes is provided to a given processing unit.

Clause 18. The method as claimed in any one of clauses 1 to 16, wherein the providing of the generated estimation of the position of the plurality of transmitting nodes comprises providing a corresponding position of a corresponding transmitting node to the corresponding transmitting node.

Clause 19. A method for estimating a position of a plurality of transmitting nodes, the method comprising:

generating a plurality of transmission quality coefficients using a plurality of data packets transmitted over a virtual communication network formed by the plurality of transmitting nodes, each transmission quality coefficient indicative of a quality of transmission between a given pair of transmitting nodes;

determining a corresponding plurality of transmission scores using the generated plurality of transmission quality coefficients and data associated with each of the plurality of transmitting nodes, each transmission score associated with a given pair of transmitting nodes;

estimating a distance between each pair of transmitting nodes using the telecommunication application, wherein the estimating of the distance between each pair of transmitting nodes is performed using a corresponding transmission score and a lookup table;

generating an estimation of a position of the plurality of transmitting nodes using the plurality of estimated distances;

providing the generated estimation of the position of the plurality of transmitting nodes; and wherein the virtual communication network is generated by installing a telecommunication application in each of the plurality of transmitting nodes;

further wherein the lookup table associates a transmission score with a corresponding distance.

Clause 20. A non-transitory computer readable storage medium for storing computer-executable instructions which, when executed, cause a processing device to perform a method for estimating a position of a plurality of transmitting nodes, the method comprising:

installing a telecommunication application in each of the plurality of transmitting nodes forming a virtual communication network;

transmitting a plurality of data packets, each data packet transmitted between a pair of transmitting nodes;

generating a plurality of transmission quality coefficients using the plurality of data packets, each transmission quality coefficient indicative of a quality of transmission between a given pair of transmitting nodes;

determining a corresponding plurality of transmission scores using the generated plurality of transmission quality coefficients and data associated with each of the plurality of transmitting nodes, each transmission score associated with a given pair of transmitting nodes;

estimating a distance between each pair of transmitting nodes using the telecommunication application, wherein the estimating of the distance between each pair of transmitting nodes is performed using a corresponding transmission score and a lookup table;

generating an estimation of a position of the plurality of transmitting nodes using the plurality of estimated distances;

providing the generated estimation of the position of the plurality of transmitting nodes; and wherein the lookup table associates a transmission score with a corresponding distance.

Clause 21. A transmitting node comprising:

a central processing unit;
a communication port operatively connected to the central processing unit, the communication port for operatively connecting the transmitting node to a plurality of transmitting nodes via a data network;
a memory unit comprising:
a telecommunication application for forming a virtual communication network between the plurality of transmitting nodes;
an application for estimating a position of a plurality of transmitting nodes, the application comprising:
instructions for generating a plurality of transmission quality coefficients using a plurality of data packets transmitted over the virtual communication network formed by the plurality of transmitting nodes, each transmission quality coefficient indicative of a quality of transmission between a given pair of transmitting nodes;
instructions for determining a corresponding plurality of transmission scores using the generated plurality of transmission quality coefficients and data associated with each of the plurality of transmitting nodes, each transmission score associated with a given pair of transmitting nodes; instructions for estimating a distance between each pair of transmitting nodes using the telecommunication application, wherein the estimating of the distance between each pair of transmitting nodes is performed using a corresponding transmission score and a lookup table;
instructions for generating an estimation of a position of the plurality of transmitting nodes using the plurality of estimated distances;
instructions for providing the generated estimation of the position of the plurality of transmitting nodes and wherein the lookup table associates a transmission score with a corresponding distance.

Although the above description relates to a specific preferred embodiment as presently contemplated by the inventor, it will be understood that the invention in its broad aspect includes functional equivalents of the elements described herein.

The invention claimed is:

1. A method for estimating a position of a plurality of transmitting nodes, the method comprising:
installing a telecommunication application in each of the plurality of transmitting nodes forming a virtual communication network;
transmitting a plurality of data packets, each data packet transmitted between a pair of transmitting nodes;
generating a plurality of transmission quality coefficients using the plurality of data packets, each transmission quality coefficient indicative of a quality of transmission between a given pair of transmitting nodes;
determining a corresponding plurality of transmission scores using the generated plurality of transmission quality coefficients and data associated with each of the plurality of transmitting nodes, each transmission score associated with two corresponding transmitting nodes;
estimating a distance between each pair of transmitting nodes using the telecommunication application, wherein the estimating of the distance between each pair of transmitting nodes is performed using a corresponding transmission score and a lookup table;
generating an estimation of a position of the plurality of transmitting nodes using the plurality of estimated distances;
providing the generated estimation of the position of the plurality of transmitting nodes; and
wherein the lookup table associates a transmission score with a corresponding distance.

2. The method of claim 1, wherein the virtual communication network is a virtual ad-hoc telecommunication network (MANET) formed by the plurality of transmitting nodes.

3. The method of claim 1, wherein each transmitting node is one of a mobile node and a fixed node.

4. The method of claim 1, wherein the transmitting of the plurality of data packets comprises generating data packets at a constant frequency between any couple of interconnected transmitting nodes.

5. The method of claim 4, wherein the data packets are generated between any couple of interconnected transmitting nodes that are direct neighbors in the virtual communication network.

6. The method of claim 1, wherein the transmitting of the plurality of data packets comprises generating data packets randomly in time according to a probability distribution.

7. The method of claim 1, wherein the transmission quality coefficients comprise quality of service (QoS) metrics.

8. The method of claim 7, wherein the quality of service (QoS) metrics is selected from a group consisting of a packet loss percentage, a path latency and a jitter.

9. The method of claim 1, wherein each transmission quality coefficient indicative of a quality of transmission between a given pair of transmitting nodes is generated by a receiving node of the given pair of transmitting node.

10. The method of claim 1, wherein the determining of a corresponding plurality of transmission scores comprises combining the generated plurality of transmission quality coefficients and data associated with the plurality of transmitting nodes.

11. The method of claim 10, wherein the data associated with the plurality of transmitting nodes comprises information data contained in a header of a corresponding received packet.

12. The method of claim 11, wherein the information data is selected from a group consisting of a nominal maximum transmission range of network interfaces of transit nodes, corresponding intermediate transmission scores of intermediate nodes, on range-based data.

13. The method of claim 1, wherein the determining of a corresponding plurality of transmission scores using the generated plurality of transmission quality coefficients and data associated with each of the plurality of transmitting nodes comprises correlating a QoS metric to an estimated value of Signal to Noise Ratio (SNR).

14. The method of claim 1, further comprising amending the lookup table over time.

15. The method of claim 1, wherein the generating of the estimation of a position of the plurality of transmitting nodes is performed by a given transmitting node of the plurality of transmitting nodes.

16. The method of claim 1, wherein the generating of the estimation of a position of the plurality of transmitting nodes is performed by another processing unit.

17. The method of claim 1, wherein the generated estimation of the position of the plurality of transmitting nodes is provided to a given processing unit.

18. The method of claim 1, wherein the providing of the generated estimation of the position of the plurality of transmitting nodes comprises providing a corresponding position of a corresponding transmitting node to the corresponding transmitting node.

19. A method for estimating a position of a plurality of transmitting nodes, the method comprising:
- generating a plurality of transmission quality coefficients using a plurality of data packets transmitted over a virtual communication network formed by the plurality of transmitting nodes, each transmission quality coefficient indicative of a quality of transmission between a given pair of transmitting nodes;
- determining a corresponding plurality of transmission scores using the generated plurality of transmission quality coefficients and data associated with each of the plurality of transmitting nodes, each transmitting score associated with two corresponding transmitting nodes;
- estimating a distance between each pair of transmitting nodes using the telecommunication application, wherein the estimating of the distance between each pair of transmitting nodes is performed using a corresponding transmission score and a lookup table;
- generating an estimation of a position of the plurality of transmitting nodes using the plurality of estimated distances;
- providing the generated estimation of the position of the plurality of transmitting nodes; and
- wherein the virtual communication network is generated by installing a telecommunication application in each of the plurality of transmitting nodes;
- further wherein the lookup table associates a transmission score with a corresponding distance.

20. A non-transitory computer readable storage medium for storing computer-executable instructions which, when executed, cause a processing device to perform a method for estimating a position of a plurality of transmitting nodes, the method comprising:
- installing a telecommunication application in each of the plurality of transmitting nodes forming a virtual communication network;
- transmitting a plurality of data packets, each data packet transmitted between a pair of transmitting nodes;
- generating a plurality of transmission quality coefficients using the plurality of data packets, each transmission quality coefficient indicative of a quality of transmission between a given pair of transmitting nodes;
- determining a corresponding plurality of transmission scores using the generated plurality of transmission quality coefficients and data associated with each of the plurality of transmitting nodes, each transmitting score associated with two corresponding transmitting nodes;
- estimating a distance between each pair of transmitting nodes using the telecommunication application, wherein the estimating of the distance between each pair of transmitting nodes is performed using a corresponding transmission score and a lookup table;
- generating an estimation of a position of the plurality of transmitting nodes using the plurality of estimated distances;
- providing the generated estimation of the position of the plurality of transmitting nodes; and
- wherein the lookup table associates a transmission score with a corresponding distance.

21. A transmitting node comprising:
- a central processing unit;
- a communication port operatively connected to the central processing unit, the communication port for operatively connecting the transmitting node to a plurality of transmitting nodes via a data network;
- a memory unit comprising:
  - a telecommunication application for forming a virtual communication network between the plurality of transmitting nodes;
  - an application for estimating a position of a plurality of transmitting nodes, the application comprising:
    - instructions for generating a plurality of transmission quality coefficients using a plurality of data packets transmitted over the virtual communication network formed by the plurality of transmitting nodes, each transmitting score associated with two corresponding transmitting nodes;
    - instructions for determining a corresponding plurality of transmission scores using the generated plurality of transmission quality coefficients and data associated with each of the plurality of transmitting nodes, each transmission score associated with a given pair of transmitting nodes;
    - instructions for estimating a distance between each pair of transmitting nodes using the telecommunication application, wherein the estimating of the distance between each pair of transmitting nodes is performed using a corresponding transmission score and a lookup table;
    - instructions for generating an estimation of a position of the plurality of transmitting nodes using the plurality of estimated distances;
    - instructions for providing the generated estimation of the position of the plurality of transmitting nodes and wherein the lookup table associates a transmission score with a corresponding distance.

* * * * *